Aug. 27, 1935.  J. P. ANDERSON  2,012,595
DUMP CAR
Filed June 1, 1932   2 Sheets-Sheet 1

INVENTOR
John P. Anderson
BY
ATTORNEY

Aug. 27, 1935.     J. P. ANDERSON     2,012,595
DUMP CAR
Filed June 1, 1932     2 Sheets-Sheet 2

INVENTOR
John P. Anderson.
BY
ATTORNEY

Patented Aug. 27, 1935

2,012,595

UNITED STATES PATENT OFFICE 2,012,595

DUMP CAR

John P. Anderson, Koppel, Pa., assignor, by mesne assignments, to Koppel Industrial Car and Equipment Company, McKees Rocks, Pa., a corporation of Pennsylvania Application June 1, 1932, Serial No. 614,668

7 Claims. (Cl. 105—276)

My invention relates to dump cars as used on railways and particularly the means for controlling the discharging door forming a wall of the car bodies. It will be apparent, however, to those skilled in the art pertaining thereto that my invention is equally adapted to road vehicles having a dump body and discharging door of similar design.

An object of my invention is to provide a means for such a car or road vehicle, to control the movements of the door as the body moves in dumping.

Another object of my invention is to provide a door controlling mechanism which will positively hold the door in closed position when the body is horizontal, will release the door for opening as the body moves in dumping and will positively close the door as the body is righted.

A further object of my invention is to provide such a door control mechanism with means permitting the door to close independently of the moving body upon striking an obstruction during the tilting of the car body.

Figure 2:
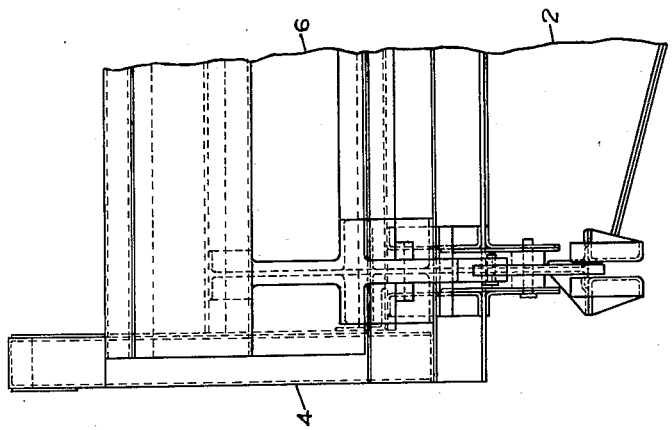
Figure 4:
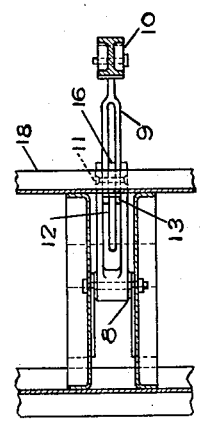
Figure 1:
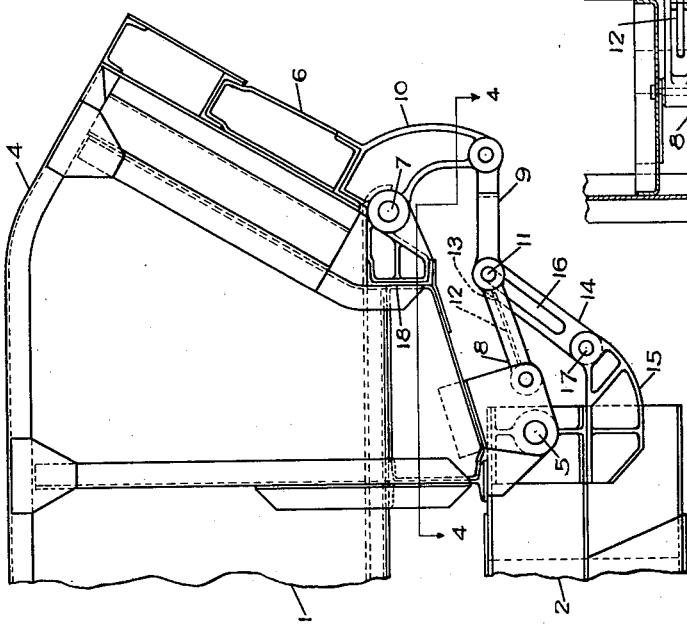
Figure 3:
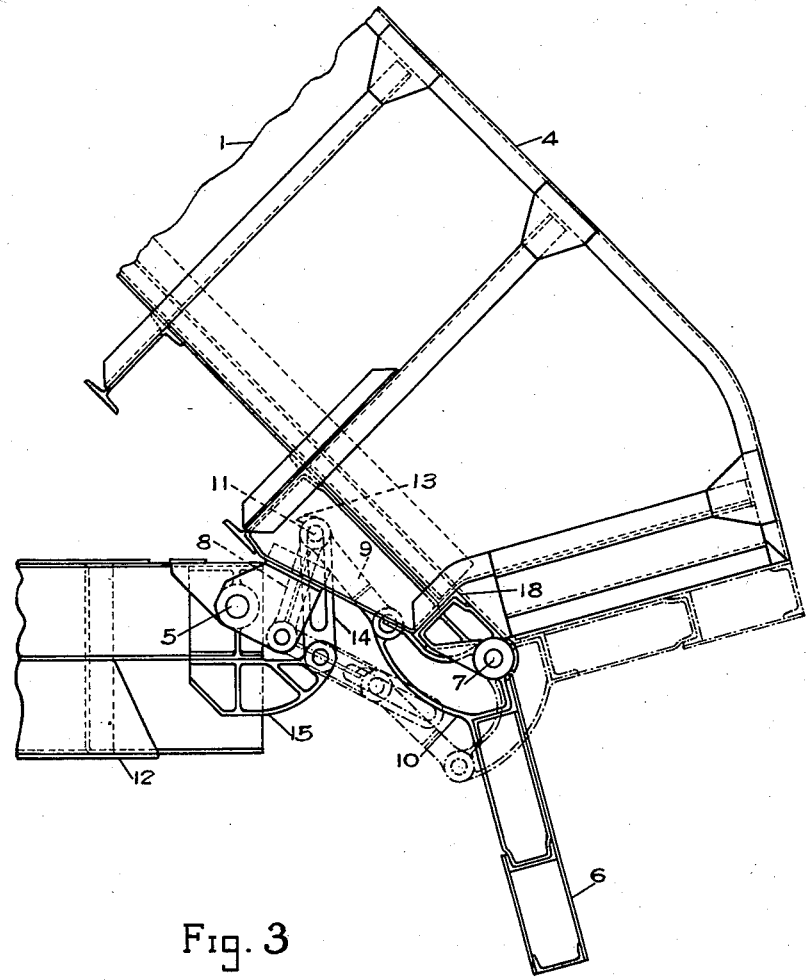

In the drawings accompanying this description Fig. 1 shows a side elevation of a portion of a dump car embodying my invention and having the car body in horizontal position; Fig. 2 shows a partial end view of the car of Fig. 1; Fig. 3 shows a similar view with the body in fully tilted position with the door in open position and shows in dot- and-dash lines how the door may remain closed or be closed during the dumping movement of the body; Fig. 4 is a section along line 4—4 of Fig. 1.

Referring now in detail to the drawings, reference character 1 indicates the car having an underframe 2, usual trucks (not shown), and a dump body 4. The body 4 is adapted to pivot about one edge of the underframe on the trunnions 5. The adjacent wall of the car body comprises a door 6 hinged adjacent the floor thereof on hinges 7 and adapted to open outwardly and downwardly as the body is tilted about the trunnions 5.

Mounted beneath the body and outwardly of the trunnions 5 is a door controlling mechanism which is pivotally connected to the door and to the underframe. This mechanism comprises a member 8 pivotally mounted on a bracket depending from the body 4, a member 9 pivotally mounted on a downwardly depending member 10 of the door and a pin 11 connecting the free ends of the members 8 and 9.

The members 8 and 9 have cooperating stop shoulders 12 and 13 mounted thereon which limit the rotation of the members relative to each other in a downward direction but permit free rotation in an upward direction. These stop shoulders are so formed as to maintain the joint between the members slightly above a straight line joining their extremities, for a purpose that will be later apparent. The members 8 and 9 when their shoulders 12 and 13 are in engagement form a compression lock between the door member 10 and the body.

Mounted on the pin 11 is a member 14 which is connected to a bracket 15 secured to the underframe. This member 14 is pivotally mounted on the bracket 15 by means of the pin 17 and has a slot 16 extending longitudinally of the member for a portion of the length thereof and engaged by the pin 11. The member 14 functions as a tension member between the pins 11 and 17 and acts to prevent the joint between the members 8 and 9 from breaking in an upward direction when the body 4 is in horizontal or load carrying position.

From an inspection of the drawings it will be apparent that when the car body 4 is in horizontal position relative to the underframe the members 8 and 9 of the door mechanism form a compression lock between the door and the body. The cooperating stop shoulders 12 and 13 preventing rotation between the members 8 and 9 in a downwardly direction and the member 14 preventing rotation in the upwardly direction. By this means the door 6 is held in closed position during the time the car body is horizontal.

When the body is tilted about the trunnions to discharge the lading, the downward movement of the adjacent end of the body causes a corresponding movement of the depending member 10 of the door. The weight of the lading against the door causes rotation thereof upon the hinges 7 so that the member 10 of the door has a movement inwardly towards the body. The resultant downward and inward movement of the member 10 causes the members 8 and 9 to break upwardly about the pin 11. The member 13 pivoting on the pin 11 pulls upon the upper end of the slot 16 and thus rotates upwardly and inwardly towards the underframe. In this manner the opening movement of the door is proportioned to the angle of tilt of the body. As the body approaches fully dumped position the depending member 10 of the door moves under and into contact with the transverse member 18 of the body to act as a stop to prevent further movement of the door.

When the car body is righted the reverse movement of the body about the underframe causes the reverse movement of the door mechanism and the door is moved into closed position.

If during the tilting of the car body the door for any reason would not open due to striking an obstruction or adhering to the lading, the door mechanism will adjust itself by the movement of the slotted portion of the link 14 over the pin 11 and thus prevent injury to the car or door mechanism. This movement of the mechanism is shown in Fig. 3 of the drawings.

Various changes and modifications in the arrangement of parts of the door mechanism will be apparent to those skilled in the art without departing from the scope of the appended claims.

Having thus described the invention, what I claim as new and desire to secure by Letters Patent is:

1. In a dump car, an underframe, a tiltable body, a door for said body and hinged adjacent the floor, a member pivotally mounted on said door, a member pivotally mounted on said body and connected to said door member, cooperating stop shoulders on said members limiting rotation between said members in one direction and means mounted on said underframe and in engagement with both of said members for controlling rotation in the other direction.

2. In a dump car in combination, an underframe, a dump body, a body pivot, a door forming a wall of said body and hinged adjacent the floor thereof, means connected to said door and to said body outwardly of the pivot for controlling the movements of said door by movement of said body upon said pivot and for selectively releasing said door for movement in one direction independent of said body.

3. In a dump car, an underframe, a dump body, a door forming a wall for said body and hinged adjacent the floor thereof, a mechanism controlling the movements of said door through movement of said body relative to the underframe, said mechanism being pivotally connected to said body and door and comprising a member pivotally mounted on the underframe slidably connected with said mechanism.

4. In a dump car, in combination, an underframe, a tiltable body, a hinged door on the body, and a door controlling means, said means comprising a toggle member pivotally connected to the door and to the body and a member pivotally mounted on the underframe and having a bifurcated portion spaced from the underframe, with said bifurcated portion embracing said toggle member.

5. In a dump car, the combination with a tiltably mounted body and a door hinged adjacent the floor of the body, of a door gear comprising a member pivoted to the door, a member pivoted to the body, and a member pivoted to the underframe, and a common connection between said members which moves relative to the underframe to control the opening and closing of the door as the body moves in dumping.

6. In an end dump vehicle of the character described, an overhanging body, an end door hinged adjacent the floor of the body and a toggle door mechanism controlling the door as the body moves in dumping, said mechanism including a tension member slidably connected to the toggle joint and pivoting upon the underframe.

7. In a dump vehicle, an underframe, a body supported directly upon the underframe, a pivotal connection between the body and underframe independent of the body supports, a door forming a wall of the body and hinged adjacent the floor thereof, a jointed member forming a compression lock between the door and body, and a link pivotally connected to said mechanism joint and underframe, said link moving relative to the underframe to control the opening and closing of the door as the body moves in dumping.

JOHN P. ANDERSON.